US008646026B2

(12) United States Patent
Chang (10) Patent No.: US 8,646,026 B2
(45) Date of Patent: Feb. 4, 2014

(54) SMART WEB SERVICES SECURITY POLICY SELECTION AND VALIDATION (75) Inventor: Symon Szu-Yuan Chang, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1303 days.

(21) Appl. No.: 11/750,242

(22) Filed: May 17, 2007

(65) Prior Publication Data

US 2008/0244692 A1   Oct. 2, 2008

Related U.S. Application Data (60) Provisional application No. 60/908,649, filed on Mar. 28, 2007.

(51) Int. Cl.
H04L 29/06 (2006.01)
(52) U.S. Cl.
USPC .............................................................. 726/1
(58) Field of Classification Search
USPC .............................................................. 726/1
See application file for complete search history.

(56) References Cited

U.S. PATENT DOCUMENTS

| 2004/0030608 | A1* | 2/2004 | Wen et al. ........................ 705/26 |
| 2004/0193696 | A1* | 9/2004 | Howard et al. ................ 709/217 |
| 2005/0188079 | A1* | 8/2005 | Motsinger et al. ............ 709/224 |
| 2005/0188221 | A1* | 8/2005 | Motsinger et al. ............ 713/201 |
| 2005/0198206 | A1  | 9/2005 | Miller et al. |
| 2005/0251853 | A1* | 11/2005 | Bhargavan et al. ............... 726/1 |
| 2005/0256947 | A1* | 11/2005 | Devarakonda et al. ....... 709/223 |
| 2006/0075465 | A1* | 4/2006 | Ramanathan et al. ............ 726/1 |
| 2006/0075466 | A1  | 4/2006 | Ramanathan et al. |
| 2006/0168332 | A1  | 7/2006 | Pfitzmann |
| 2006/0230430 | A1* | 10/2006 | Hondo et al. ..................... 726/1 |
| 2007/0078991 | A1* | 4/2007 | Kim .............................. 709/228 |
| 2007/0130520 | A1* | 6/2007 | Skunberg et al. ............. 715/700 |
| 2008/0172714 | A1* | 7/2008 | Ono et al. ......................... 726/1 |

* cited by examiner

Primary Examiner — Bradley Holder
(74) Attorney, Agent, or Firm — Fliesler Meyer LLP (57) ABSTRACT A computer-implemented method to select a web service security policy alternative can comprise selecting a web service security policy alternative at runtime based on previously collected data concerning web service and using the selected web service security policy alternative for a web service message. In addition, a computer-implemented method to prevent intrusion can use a honey policy that can be defined by the administrator in order to attract and closely monitor the hackers.

17 Claims, 9 Drawing Sheets

SMART WEB SERVICES SECURITY POLICY SELECTION AND VALIDATION

CLAIM OF PRIORITY

This application claims priority from the following application, which is hereby incorporated by reference in its entirety:

U.S. Provisional Application No. 60/908,649, entitled SMART WEB SERVICES POLICY SELECTION USING MACHINE LEARNING, by Symon Szu-Yuan Chang, filed on Mar. 28, 2007.

CROSS-REFERENCED CASES

The following application is cross-referenced and incorporated herein by reference:

U.S. patent application No. 11/750,249 entitled SMART WEB SERVICES POLICY SELECTION USING MACHINE LEARNING, by Symon Szu-Yuan Chang, filed on May 17, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to web services. In particular, the invention relates to the selection of a Web Service policy alternative.

BACKGROUND

One of the biggest benefits for Web Services is the interoperability in a large distributed computing environment. The interoperability of Web Services is achieved by using Web Services policy to control the message format. Instead of using different applications, same application can be used along with different Web Services policy configurations to communicate with other parties over the network.

The Web Services policy is expressed in an XML format. Web Service Policy provides a flexible and extensible grammar for expressing the capabilities, requirements, and general characteristics of entities in an XML Web Service-based system. Web Service Policy defines a policy to be a collection of policy alternatives, where each policy alternative is a collection of policy assertions.

Web Service Policy assertions will define the configuration for various WS standards, include the following:
  WS Security
  WS Security Policy
  WS Reliable Messaging
  WS Addressing
  WS Secure Conversation
  WS Trust
  SAML (Security Assertion Markup Language)
  MTOM (Message Transmission Optimization Mechanism)
  Other WS-* standards Each standard has many options that can be configured for the communication between a Web Services Requester and a Web Services Provider. The different options in defining the Web Services policy results in multiple Web Services policy alternatives at runtime are available for each Services Requestor and Service Provider pair, whereas only one policy alternative can be selected and used.

Figure 1:
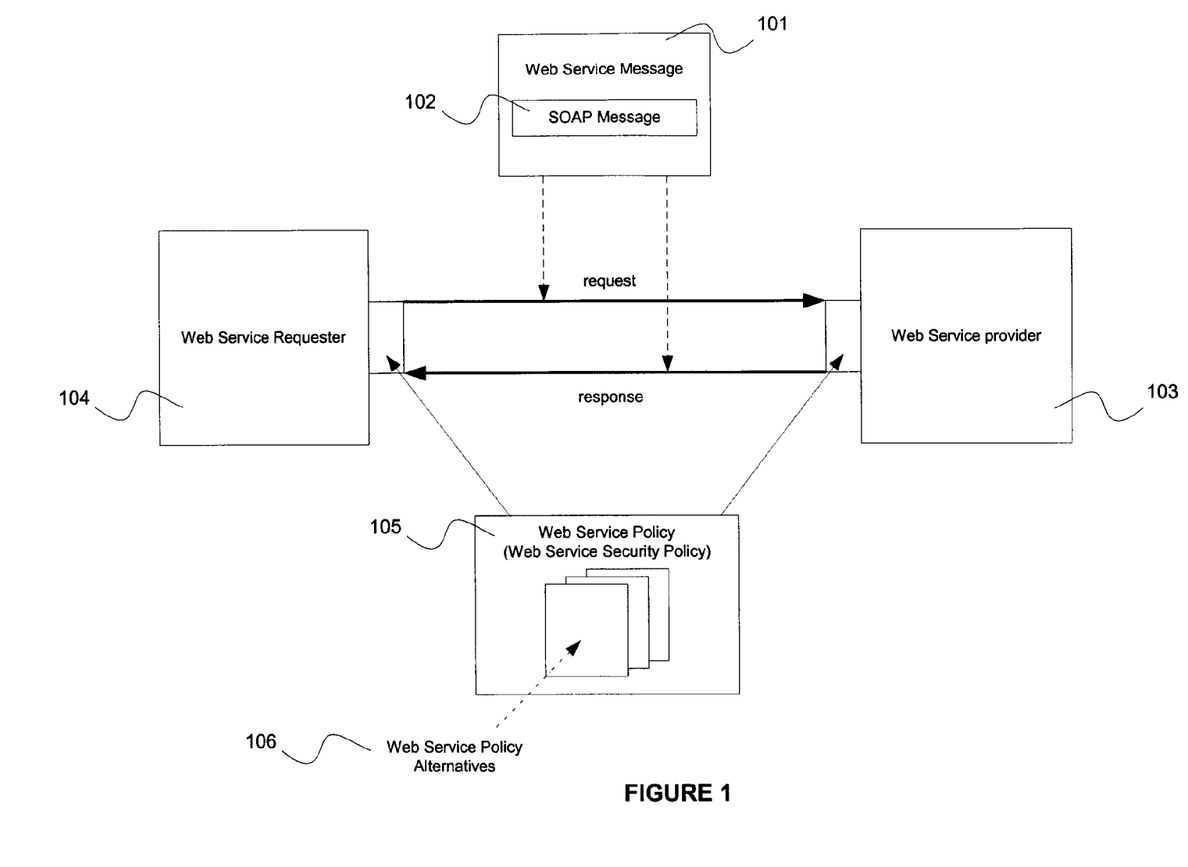
FIG. 1 is an illustration of an exemplary framework of Web Service Policy that directs the sending and receiving Web Service message between a Web Service Requester and a Web Service Provider.
Figure 2:
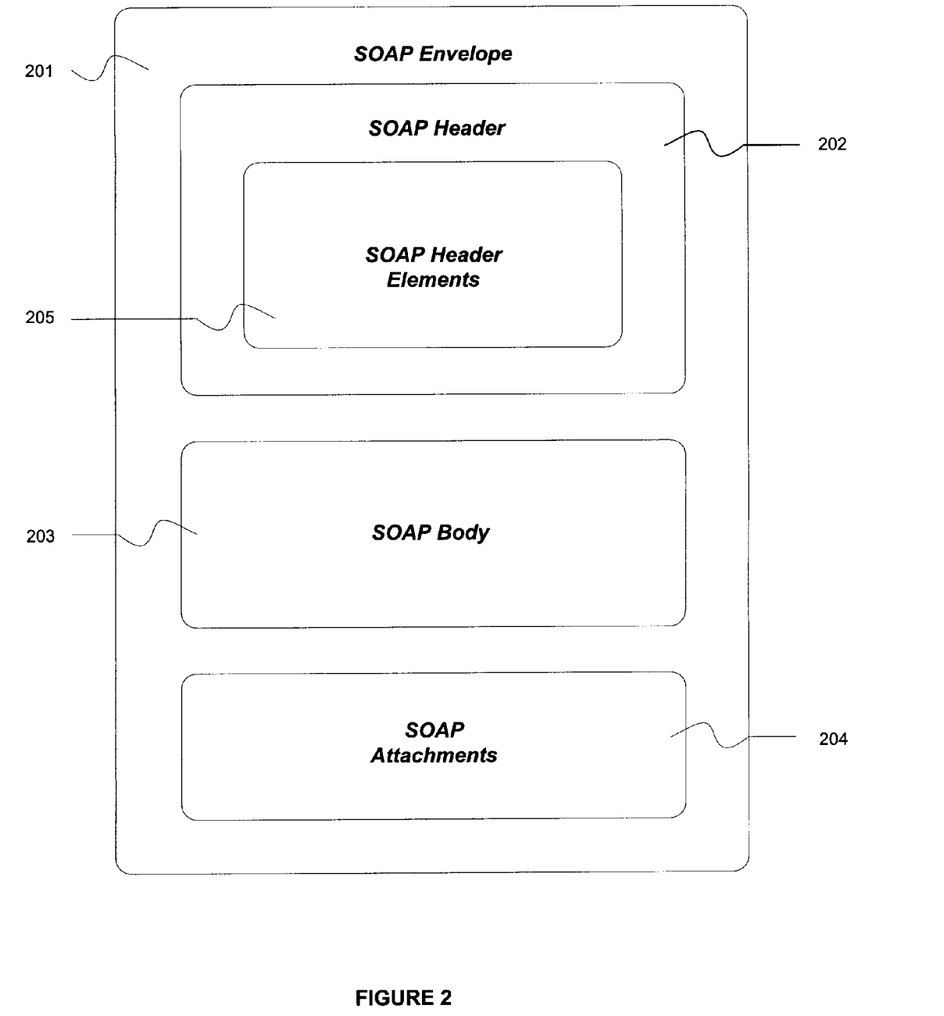
FIG. 2 is an exemplary illustration of a SOAP message.

As shown in FIG. 1, Web Service messages 101, such as SOAP messages 102, flow between Web Service initiator (Service requester) 104 and Web Service recipient (Service Provider) 103. Web Service Policy 105 defines the requirements for achieving reliability and Security. The policy also defines how to generate the Web Services messages 101 for request and response, including which elements 205 should be included in the SOAP header 202, which action should be taken for the SOAP body 203 and which attachments 204 should be included in the SOAP envelop 201, as shown in FIG. 2.

The service requester 104 will generate a SOAP message 102, based on the Web Service Policy 105. The service requester 104 will then send the SOAP message 102 to the Web Services provider 103. The message receiver 103 will, in turn, base on the policy to validate the incoming SOAP message 102 that in fact is in compliance with the policy 105. The receiver 103 also takes proper actions to process the incoming SOAP message 102 based on the Web Service Policy 105.

The service receiver 103 will also generate a response message, based on the Web Service Policy 105. The receiver 103 will then send the SOAP message 102 back to the requester 104. Upon receiving the response, the requester 104 will validate the incoming response message and perform proper actions, based on the Web Service Policy 105.

For each Web Services request and response, the Web Service standards allow multiple policy alternatives 106. The combination of different Web Service standards and different aspects of the Web Services configurations will create even more policy alternatives.

Figure 3:
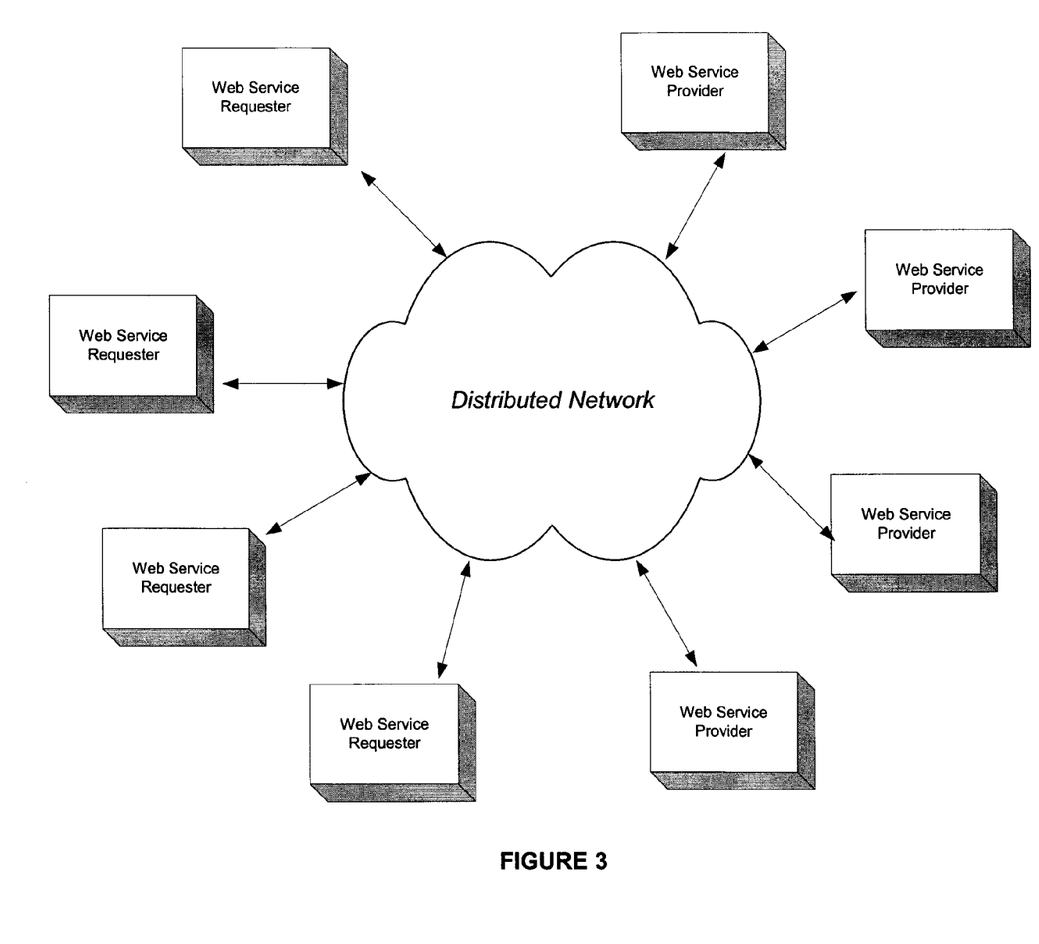
FIG. 3 is an exemplary illustration of many-to-many relationship between the service provider and service requester.

As shown in FIG. 3, in a large distributed environment, there are many-to-many relationship between the service provider 104 and service requester 103. Each service has multiple ports, and each port will have different policy attach to it. Each requester and provider pair may have multiple policy alternatives available at runtime. This makes the selection of policy alternative even more complicated.

Web Service Security Policy

Web Services security requirements include securing Web Services for authentication, confidentiality, integrity and non-repudiation. For SOAP messages flow between Web Service initiator and recipient, Web Services Security Policy defines how to meet these security requirements.

There are many ways to define a security policy. Among them, OASIS WS-SX TC is an open standard body that defines the Web Services Security Policy standard (WSSP). WSSP defines the policy assertion syntax on how to generate the secure Web Services massages for request and response.

A service requester 104 will generate a SOAP message 102 based on a Web Service security policy 105, and send the message to a Web Services provider 103. The message receiver 103 will then validate the incoming SOAP message 102 against the security policy 105 to determine whether it is in fact in compliance with the security policy 105. The receiver 103 will also generate a response SOAP message 102 based on the security policy 105 and send the response SOAP message 102 back to the requester 104. Upon receiving the response SOAP message 102, the requester 103 will validate the incoming response message based on the security policy 105.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

One embodiment of present invention will provide a smart mechanism to select the best policy alternative for both message request and response.

The current approaches for policy selection are: 1) the user manually selecting through some predefined agreements; 2) online negotiation; 3) selecting by the Web Services platform randomly. As for the first approach, the user has to have in-depth technical knowledge of security, performance and interoperability for each security policy alternative, and the implication of them. As for the online negotiation approach, the interoperability can be ensured, but the security and performance aspects cannot be addressed. As for the last approach, a randomly selected Web Services policy alternative lacks necessary consideration of interoperability, performance and security.

In one embodiment of present invention, the policy assertions will not be limited to the options and alternatives in the above WS standards, instead it can cover the following six aspects of the Web Services configurations:

What—what should be done for certain part of the SOAP message. For example, the SOAP Body should be encrypted.

How—how to do it, or which method or algorithm should be used. For example, the signature and encryption should use AES algorithm.

Where—which node should do what operation in multi-hop situation

Who and Whom—who is allowed to do what and whom should we trust. For example, we only accept the trust token issued by Bank ABC, or only allow manager to access this service.

Which—which object should be applied. For example, use public key XYZ to sign the message, or we will only accept the signature When—when it should be done. For example, the message is expired after 5 minutes, or the message is not available before certain date.

Figure 4:
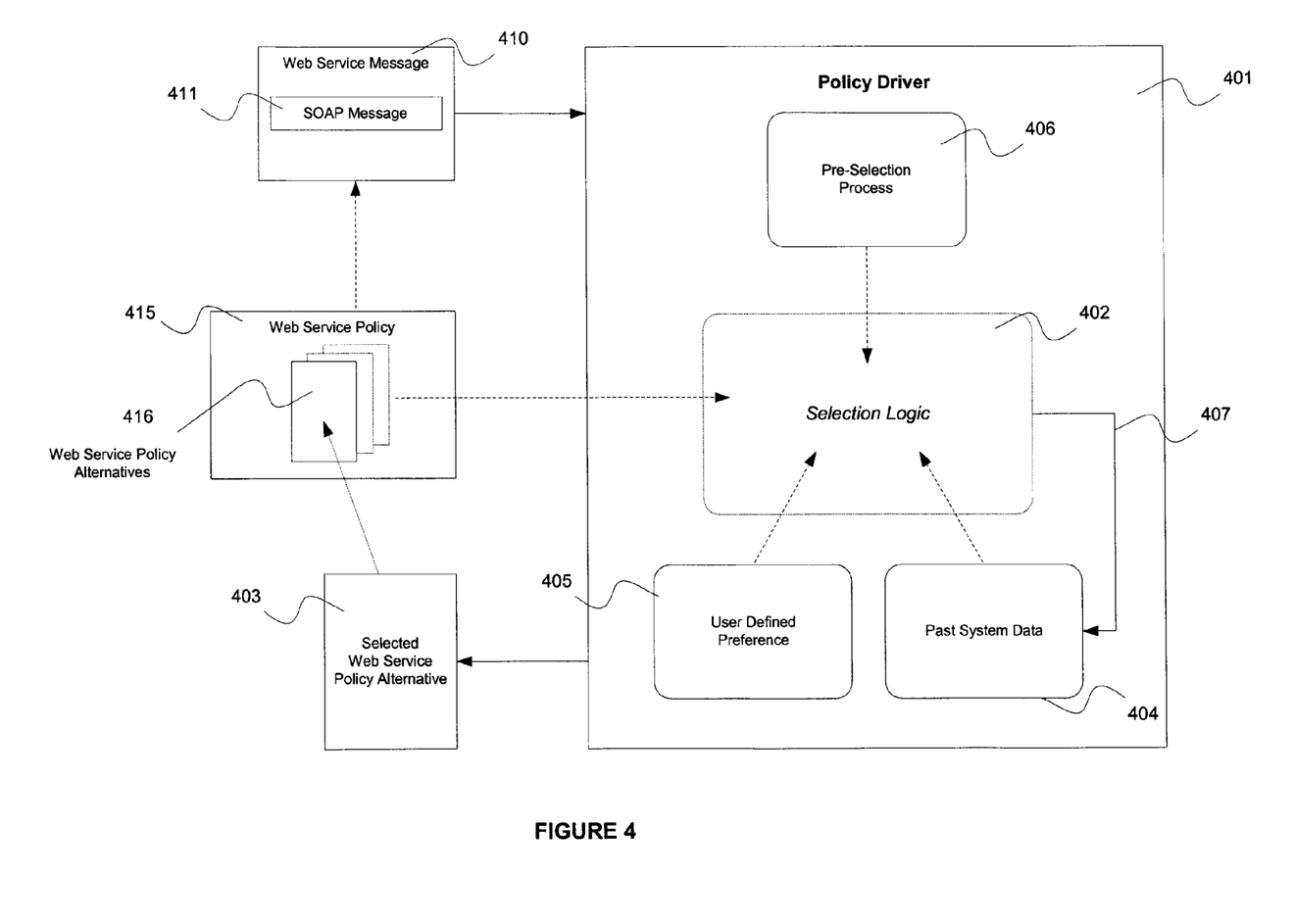
FIG. 4 is an exemplary illustration of selecting a Web Services policy alternative that is associated with a Web Services message using a policy driver in accordance with embodiments of the present invention.

One embodiment of present invention, a computer-implemented method to select a web service policy alternative 403, can comprise first selecting a web service policy alternative at runtime based on previously collected data 404 concerning web services and using the selected web service policy alternative for a web service message 410.

Another embodiment of present invention, a computer-implemented method to select a web service policy alternative, can further comprise receiving general user preferences 405 in selecting the web service policy alternative for a given client and server pair. Based on the user preference, a previous determined score can be used instead of or in combination with other previously collected data concerning web service.

The user preference 405 can include interoperability within a distributed computing environment, end-to-end system performance, and functionality completeness in both reliability and security. More specifically, a previous determined security score can be used instead of previously collected data concerning web service when user selects security as preference. In addition, the user preference can be supplied either during installation or at runtime. The web service message 410 can be a SOAP message 411.

One embodiment of present invention, a computer-implemented method to select a web service policy alternative 403, can comprise: selecting a web service policy alternative at runtime based on previously collected data concerning web service for a web service requester and web service provider pair; and using the selected web service policy alternative for a web service message between the web service requester and web service provider pair.

In other embodiments of present invention, a computer-implemented method to select a web service policy alternative 403, can allow that: multiple pairs of web service requesters and web service providers can be involved in the selection and usage of a web service policy alternative; multiple web service policy alternatives can be selected and used; and the selected web service policy alternative can be used for multiple web service messages between the web service requester and web service provider pair.

Another embodiment of present invention, a computer-implemented machine learning method to select a web service policy alternative, can comprise tracking past system performance 404 of web service messages, selecting a web service policy alternative at runtime based on previously collected system performance concerning web service, and using the selected web service policy alternative 403 for a web service message 410. The past system performance can be past end-to-end system performance. The past end-to-end system performance can also include response time, error conditions.

In one embodiment of present invention, a computer-implemented method to select a web service policy alternative can comprise a pre-selection process 406 followed by selecting a web service policy at runtime based on previously collected data concerning web service and using the selected web service policy 403 for a web service message, wherein the pre-selection process 406 can include first normalizing all different policy alternatives 416 into a standard form, then checking to ensure no conflict among policy alternatives and eliminating bad alternatives from available policy alternative pool. The policy alternatives 416 can exist in the form of different policy language standards or different versions of the same policy language standard.

In some embodiments of present invention, the pre-selection process 406 can include eliminating policy alternatives related to an unsupported feature. The policy alternatives related to the prior unsupported feature can later be made available for selection once the feature is supported in a later time.

In some embodiments of present invention, the pre-selection process 406 can include eliminating policy alternatives related to the unavailable objects and then making policy alternatives related to the objects available for selection once the object is available. Such object can be X509, Public/Private Key, or credential for authentication. The availability of each object depends on the installation, since different installation have different availability of objects.

In one embodiment of present invention, a computer-implemented method to select a web service policy can also comprise receiving a user preference 405 in selecting the web service policy for a given client and server pair; a pre-selection process 406 that can include normalizing all different policy alternatives 416 into a standard form, checking to ensure no conflict among policy alternatives and eliminating bad alternative from available policy alternative pool; tracking past system performance of web service messages; selecting a web service policy at runtime based on the pre-selection process 406 and the past system performance 404 concerning web service; and using the selected web service policy 403 for a web service message.

In one embodiment of present invention, as shown in FIG. 4, a computer-implemented system can comprise a web service message 410 based on a web service policy 415 and a policy driver 401, wherein the policy 415 can include a collection of policy alternatives 416 and the policy driver 401 is capable of receiving the web service policy 415 and selecting a policy alternative based on selection logic 402.

Figure 5:
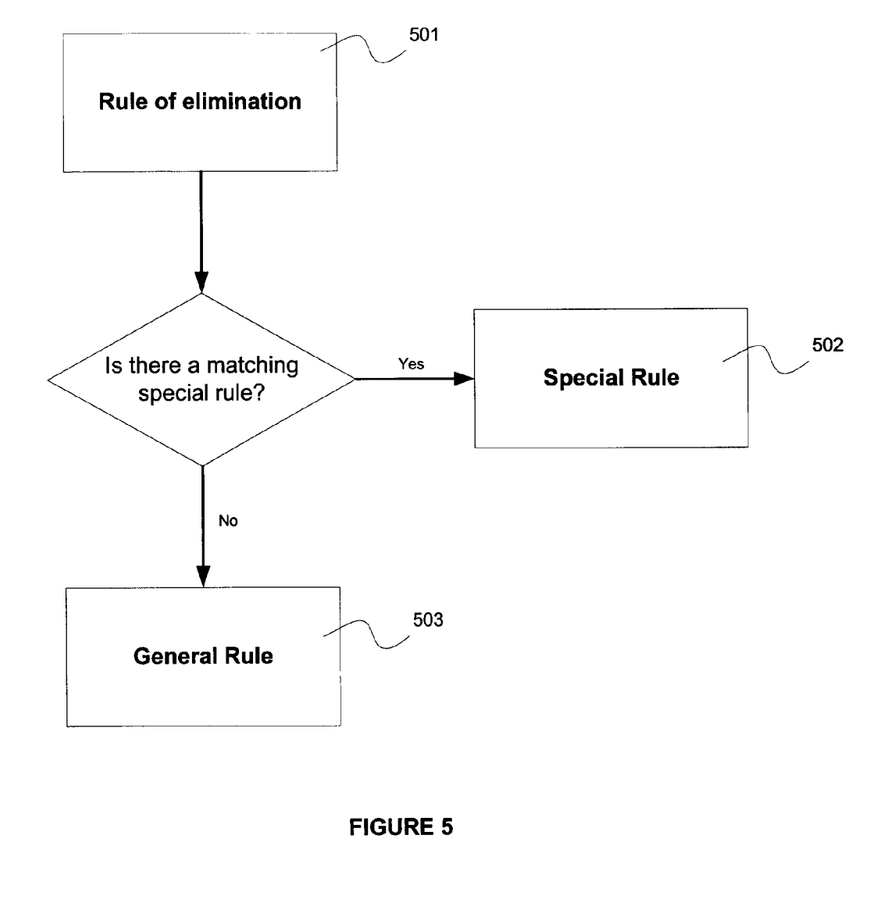
FIG. 5 is an exemplary illustration of the selection logic that is used in a policy driver in accordance with embodiments of the present invention.
Figure 6A:
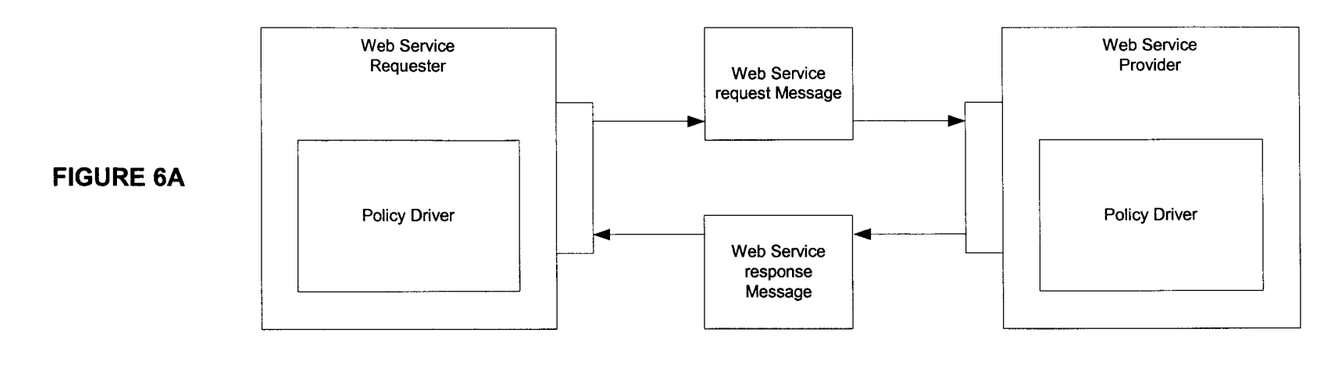
FIG. 6A is an exemplary illustration of the interaction between a Web Services Requester with a policy driver and a Web Services Provider with a policy driver in accordance with embodiments of the present invention.
Figure 6B:
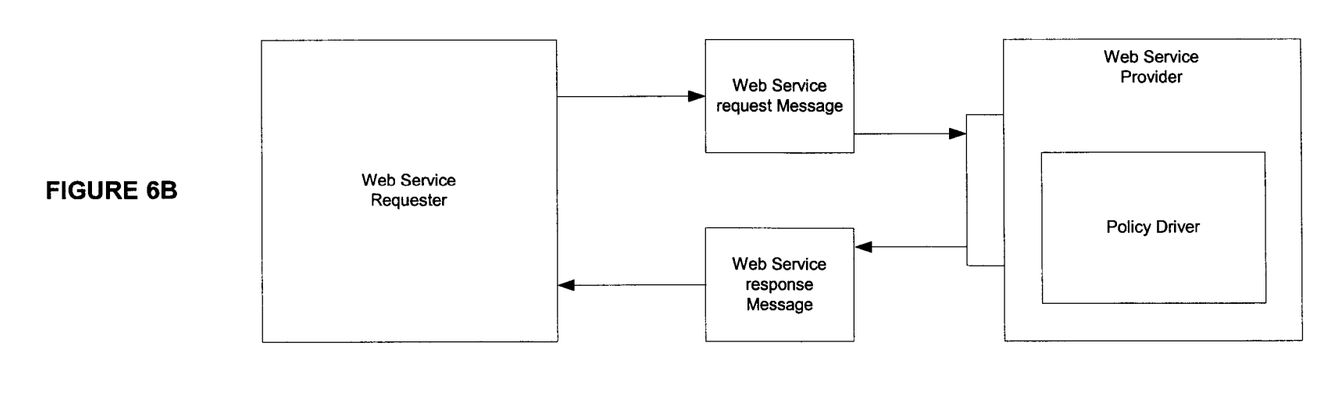
FIG. 6B is an exemplary illustration of the interaction between a Web Services Requester without a policy driver and a Web Services Provider with a policy driver in accordance with embodiments of the present invention.

In one embodiment of present invention, as shown in FIG. 5, the selection logic 402 can include one or more steps of applying a rule of elimination 501 to narrow down policy alternative candidates for selection; applying a special rule 502 when the special rule is a match; and applying a general rule 503 when there is no matching special rule.

In some embodiments of present invention, the rule of elimination 501 can be any one or combination of the following rules:
1. if there are no multiple alternatives, then no selection;
2. if the required credential associated with a policy alternative is not available, then the policy alternative is eliminated;
3. if the required key/certificate associated with a policy alternative is not available, then the policy alternative is eliminated;
4. if the given algorithm associated with a policy alternative is not available, then the policy alternative is eliminated;
5. if the feature associated with a policy alternative is not supported, then the policy alternative is eliminated;
6. if a policy has conflicted requirements, then all policy alternatives within the policy are eliminated;
7. if a policy can not be applied to the message, then all policy alternatives within the policy are eliminated;
8. if a policy assertion within a policy alternative is unknown, then the policy alternative is eliminated.

In some embodiments of present invention, the special rule 502 can be any one or combination of the following rules:
9. if there is only one policy left after elimination, then the selection is done.
10. if the message is a response message wherein a prior request message is available, then:
    a) the namespace in the prior request message (e.g. WSS1.0 or WSS 1.1) will be used for the response message;
    b) if choose between encryption vs. no encryption, or signature vs. no signature, then whether the prior request message has or doesn't have encryption or signature will be the cues for selection;
    c) a matching algorithm of the algorithm used in the prior request message is used in the response message;
11. the response policy will be the reference for the request policy.

In some embodiments of present invention, the general rule 503 can be any one or combination of the followings:
12. If the selection is related to preference of performance vs. security, the performance will win when the performance is the highest preference.
13. If the selection is related to different versions, the lower version will win to ensure the compatibility.
14. If the interoperability is the highest preference, then the lower version will win.
15. If the selection is related to the different functions, and the function completeness is the highest preference, then the policy alternative which has more functions will win.
16. If the system performance is the highest preference, then all policy alternative that has optional assertions will be in the bottom of the selection pool. The one without optional assertion will win.
17. If there are no cues for the selection, then the first alternative will be selected to try out.
18. If the selection does not work out, then the next alternative will be used to try it out.

In one embodiment of present invention, the selected Web Service security policy alternative 403 can be applied to generating SOAP messages 411 for Web Service request and response, as well as validating incoming request or response SOAP messages 411. In another embodiment of present invention, the selected Web Service security policy alternative 403 can be applied to generating secured SOAP message 411 in the SOA environment in the case of multiple policy alternatives are provided.

User Defined Preferences

One embodiment of present invention will take consideration of the following in selecting for the best policy alternative for a given client and server pair in a large distributed environment:

Interoperability
End-to-end System Performance
Function completeness in both reliability and security.

In one embodiment of present invention, the Web Services administrator can define the preference for the above three items, and the system will use a machine learning process to select the best policy alternative at runtime.

In one embodiment of present invention, each policy alternative 416 will be analyzed to determine a functional score. For example, if security is the highest priority for the user, then the securest policy alternative will be selected in one embodiment of present invention. If reliability is the highest priority for the user, then the more reliable policy alternative will be selected in another embodiment of present invention. A Web Services Administrator also can select performance as preference. In this case, the selected policy alternative 403 will result in fastest processing of Web Service request and response.

In some embodiments of present inventions, user preference can be supplied during the installation, or during the runtime from the configuration UI.

Machine Learning Process

In one embodiment of present invention, the Server can keep tracking the past performance to find the best performance policy alternative for each client-server pair. The past performance 404 can be the end-to-end performance. In another embodiment of present invention, the Server can track the response time. For example, the time from building a SOAP message and sending it to the service provider, to getting response and completing processing the response message.

The system can track error conditions too. It can detect the problem of inappropriate policy alternative selection, and automatically fix the problem by using a policy alternative that will interoperate well with its partner.

In other embodiments of present invention, the process can also track the policy preference for each client so that the maximum interoperability can be achieved via the machine learning process. In the case when multiple policy alternatives are available for selection at request message initiation time or at the time of responding to a request from a client, a smart policy selection can be made based on a machines-learning process that uses data from prior Web Services conversations with each client.

In one example, Client A always uses WSS 1.0 and Triple-DES algorithm in security when send a secured message to the server; while Client B always uses WSS 1.1 and AES 256 algorithm in security. When the server sends a response message or initiate a new SOAP message to these two different clients, in one embodiment of present invention, the server will base on the preferences it has learned from the prior conversations to select policy alternative that has WSS 1.0 and Triple-DES or WSS 1.1 and AES 256 accordingly.

Automatically tracking of the Web Services performance behavior and error conditions at runtime can provide in-depth information for the system performance and interoperability. This information can then be fed back into the policy selection process, so that an intelligent policy alternative selection can be made.

Pre-Selection Process

In one embodiment of present invention, before going into the policy alternatives selection process, the system will performance a policy alternative filtering and policy standardization process.

The policy can be defined in different version of the policy language format and can have different namespaces. The system can go through the standardization process to normalize the policy into a platform independent and version independent form for the selection process. This pre-selection process 406 can eliminate the interoperation problems from different versions of WS-Policy.

For example, the policy alternatives come from different source may use different version of WS-Policy to define its policy assertion, such as WS-Policy version 1.2 and W3C's WS-Policy version 1.5. The pre-selection process 406 can normalize all different policy alternatives into a standardized form for the selection.

The system can check to ensure there is no confliction among the policy alternatives. Should illegal or conflicting policy alternatives be found, bad alternatives can be eliminated from the available policy alternative pool, and will not be available for selection.

This elimination process can also apply if there are unsupported features. When a feature is not supported, the policy alternatives that are related to the feature will not be selected. When the feature is supported later, then the related policy alternatives can be set to be available for selection automatically.

For example, if Kerberos Token Profile is not supported for a given system, the policy alternative of using Kerberos for authentication will be eliminated. When the Kerberos Token Profile is supported later, the Kerberos related policy alternative can then become available for selection automatically, without any policy modification.

The elimination process can apply to the availability of objects too. The objects can be credential for authentication such as the X509 Public/Private Key, or parts in the SOAP message. When an object is not available, the policy alternatives associated with the object can become not enforceable, and those alternatives can be eliminated from the available policy alternative pool, and will not be available for selection either.

For example, the policy alternative is related to the MTOM for the SOAP attachment policy, but the message does not have any attachment, then that MTOM related policy alternative can be eliminated.

In another example for the X509 certificate, if there is one policy alternative that requires using X509V1 for signature and encryption in the X509 token profile assertion while another alternative requires X509V3, the system will check which version of X509 certificate is available and only make the proper policy alternative available for selection accordingly.

The credential for authentication can include user name and password, X509 Certificates, SAML Token Profile, Kerberos, etc. Similar filtering process can apply to the credential for authentication so that only the policy alternative that required credential is available will get into the available policy alternative pool for selection and all other policy alternatives that required an unavailable credential will be eliminated, and will not be available for selection automatically.

Web Service Security Policy (WSSP)

WSSP standard does not define how to select a security policy alternative if multiple security policy alternatives are available. For each Web Services request and response, WSSP standard allows multiple security policy alternatives. However, WSSP standard does not define how to select a security policy if multiple policy alternatives exist. Therefore, how to select the proper security policy alternative for given Web Services is a big challenge.

An inappropriate selection of the security policy alternative may cause interoperability problems, and create poor system performance problems. It will even create problems in reliability and vulnerability in security for mission critical SOA applications.

In addition, Web Services security and its policy standards focus on the interoperability, so that multiple vendors on different platforms can communicate to each other using the standard format. However, it does not address the issue of intrusion detection and intrusion prevention.

In one embodiment of present invention, a computer-implemented method to select a web service security policy alternative 403 can comprise selecting a web service security policy alternative at runtime based on previously collected data concerning web service and using the selected web service security policy alternative for a web service message 101.

One embodiment of present invention selects the best Web Service security policy alternative when the secured SOAP message is required and there are multiple security policy alternatives for selection at the runtime. It applies to the generation of both SOAP messages for request and response, as well as the validation of incoming request and response SOAP messages. Another embodiment of present invention will detect the intrusion and prevent the service from being hacked by the intruders.

One embodiment of present invention will select the best policy alternative to generate the secured SOAP message in SOA environment in the case of multiple policy alternatives are provided. It will also consider which policy alternative has been selected at the time of validating the incoming secured SOAP message, and take proper action to prevent security attacks.

In one embodiment of present invention, a computer-implemented method to select a web service security policy alternative 403 can further comprise receiving a user preference in selecting the web service security policy alternative for a given client and server pair. Based on the user preference, a previous determined score can be used instead of or in combination with other previously collected data concerning web service.

The user preference 405 can include interoperability, system performance, or function completeness in both reliability and security. In addition, the user preference can be supplied during installation or at runtime and the web service message 410 can be a SOAP message 411. More specifically, a previous determined security score can be used instead of previously collected data concerning web service when user selects security as preference. In addition, the user preference can be supplied either during installation or at runtime.

One embodiment of present invention, a computer-implemented method to select a web service security policy alternative 403, can comprise: selecting a web service security policy alternative at runtime based on previously collected data concerning web service for a web service requester and web service provider pair; and using the selected web service security policy alternative for a web service message between the web service requester and web service provider pair.

In other embodiments of present invention, a computer-implemented method to select a web service security policy alternative 403, can allow that: multiple pairs of web service requesters and web service providers can be involved in the selection and usage of a web service security policy alternative; multiple web service security policy alternatives can be selected and used; and the selected web service security policy alternative can be used for multiple web service messages between the web service requester and web service provider pair.

In one embodiment of present invention, a computer-implemented machine learning method to select a web service security policy alternative 403 can comprise tracking past system performance of web service messages 404; selecting a web service security policy alternative at runtime based on previously collected system performance concerning web service security; and using the selected web service security policy alternative 407 for a web service message. The past system performance includes web service performance behavior and error conditions. In addition, the past system performance includes past security policy usage history.

In one embodiment of present invention, a computer-implemented machine learning method to select a web service security policy alternative 403 can comprise further comprise saving and analyzing in real-time and online the process information of each out-going or incoming messages to or from different end points.

In one embodiment of present invention, a computer-implemented machine learning method to select a web service security policy alternative can further comprise performing anomaly analysis.

In one embodiment of present invention, a computer-implemented machine learning method to select a web service security policy alternative can further comprise automatically fixing the error conditions.

In one embodiment of present invention, a computer-implemented method to select a web service security policy alternative can comprise a pre-selection process 403 that followed by selecting a web service security policy at runtime based on previously collected data concerning web service 404 and using the selected web service policy for a web service message 410.

The pre-selection process 406 can include normalizing all different policy alternatives 416 into a standard form, eliminating bad alternative from available policy alternative pool based on a rule, selecting a web service security policy at runtime based on previously collected data concerning web service; and using the selected web service policy for a web service message.

In addition, the pre-selection process 406 can include eliminating policy alternatives related to unsupported security feature, unknown assertion, conflicted assertion, unavailable credential, unsupported algorithm, unavailable X509 certificate or public/private key.

Figure 7A:
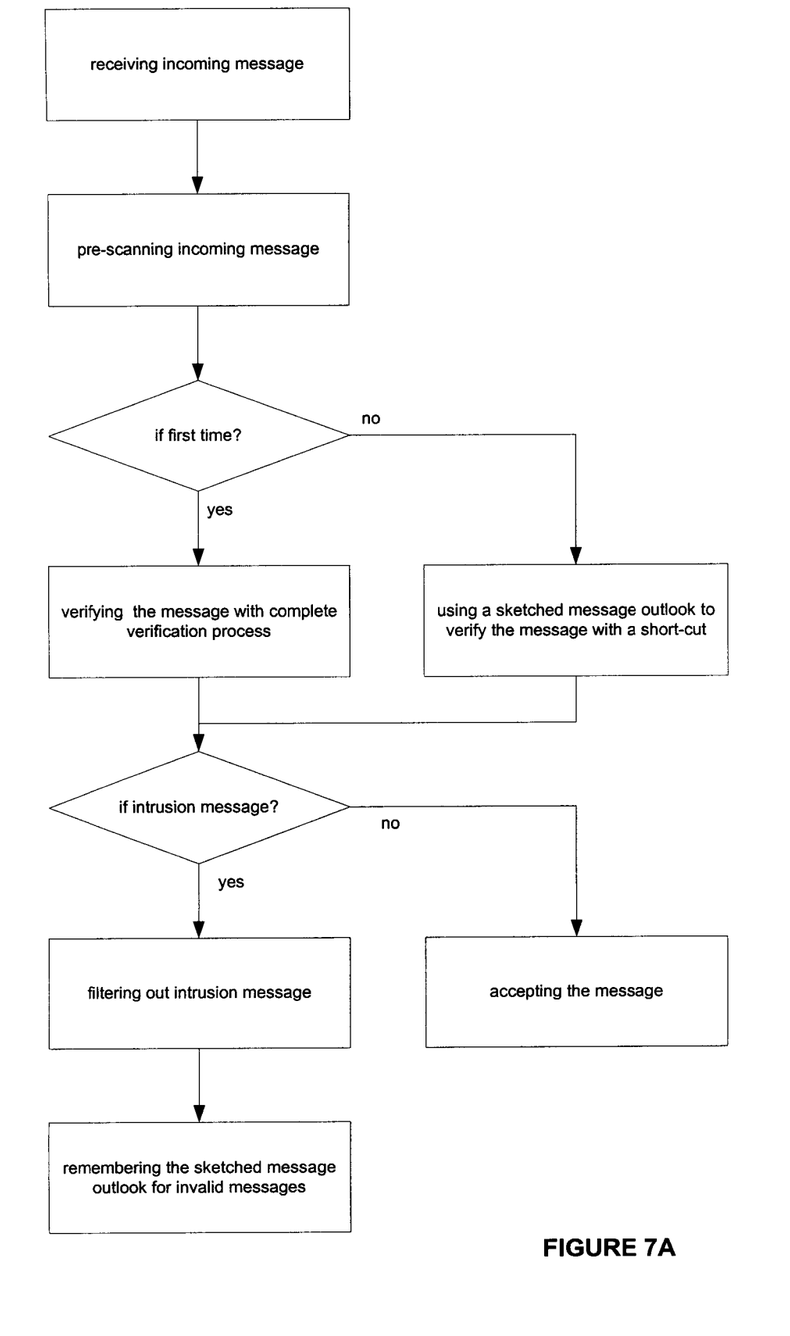
FIG. 7A is an illustration of an overview of detecting incoming intrusion message in accordance with embodiments of the present invention.
Figure 7B:
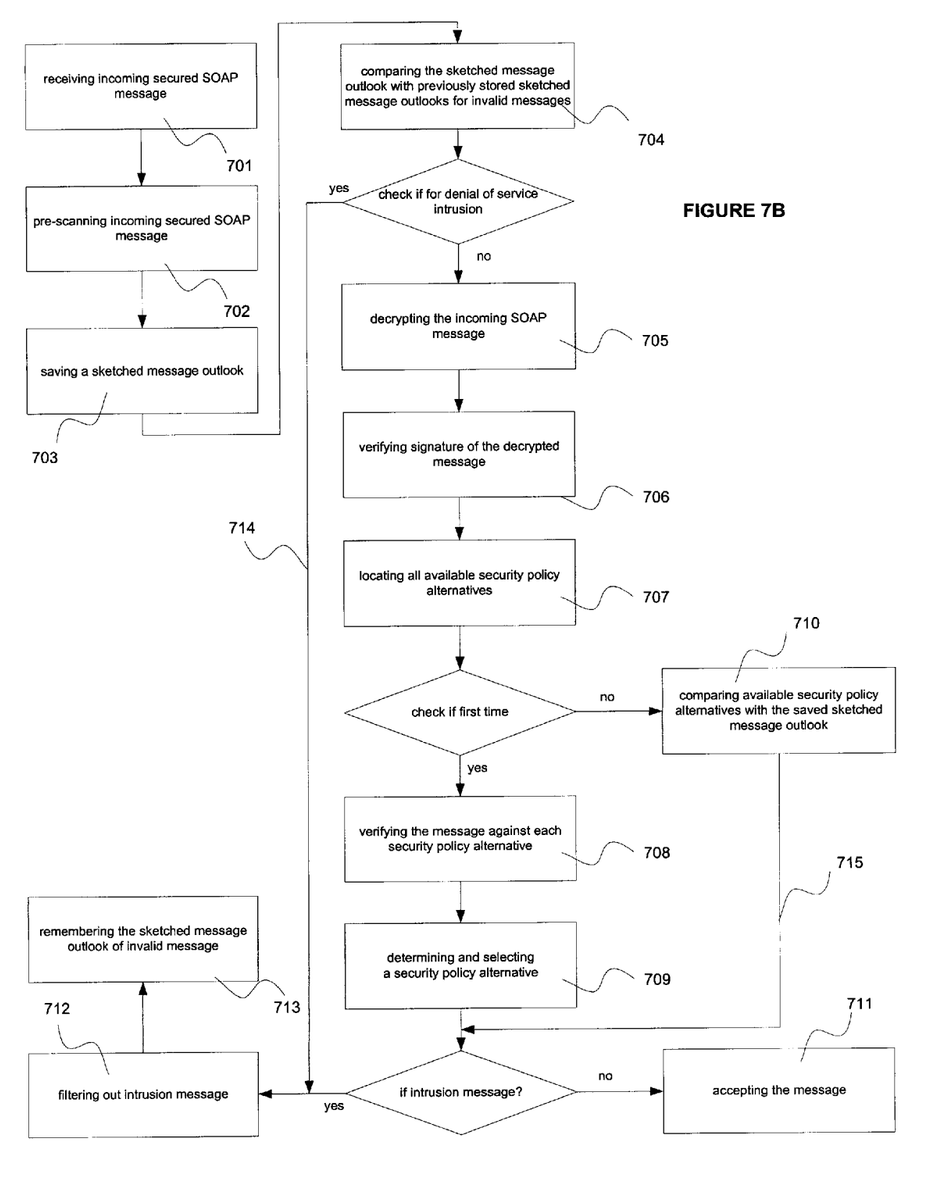
FIG. 7B is an illustration of an exemplary process chart of detecting incoming intrusion message in accordance with embodiments of the present invention.

In one embodiment of present invention, a computer-implemented machine learning method to prevent intrusion can comprise: pre-scanning an incoming web service message 702 before decryption; and rejecting the incoming web service message 712 based on pre-scanning 702 if pre-scanning indicates that the incoming web service message is an intrusion.

In one embodiment of present invention, a computer-implemented machine learning method to prevent intrusion can further comprise comparing a sketched message outlook associated with the incoming web service message with previously collected sketched message outlook 704, wherein the sketched message outlook associated with the incoming web service message is a result of pre-scanning of the incoming web service message 702.

In one embodiment of present invention, a computer-implemented machine learning method to prevent intrusion can further comprise: saving the sketched message outlook of incoming message 703; decrypting the incoming message 705 and retrieving policy alternatives 707; comparing available alternatives with the sketched message outlook 710; and eliminating unqualified policy alternative from available policy alternatives 712. The sketched message outlook can be a copy summary, or hash of the incoming web service message 410.

In one embodiment of present invention, a computer-implemented machine learning method to prevent intrusion can further comprise verifying the message against each available policy alternative 708 and remembering the sketched message outlook of incoming message 713 if the message is from an intrusion.

Figure 8:
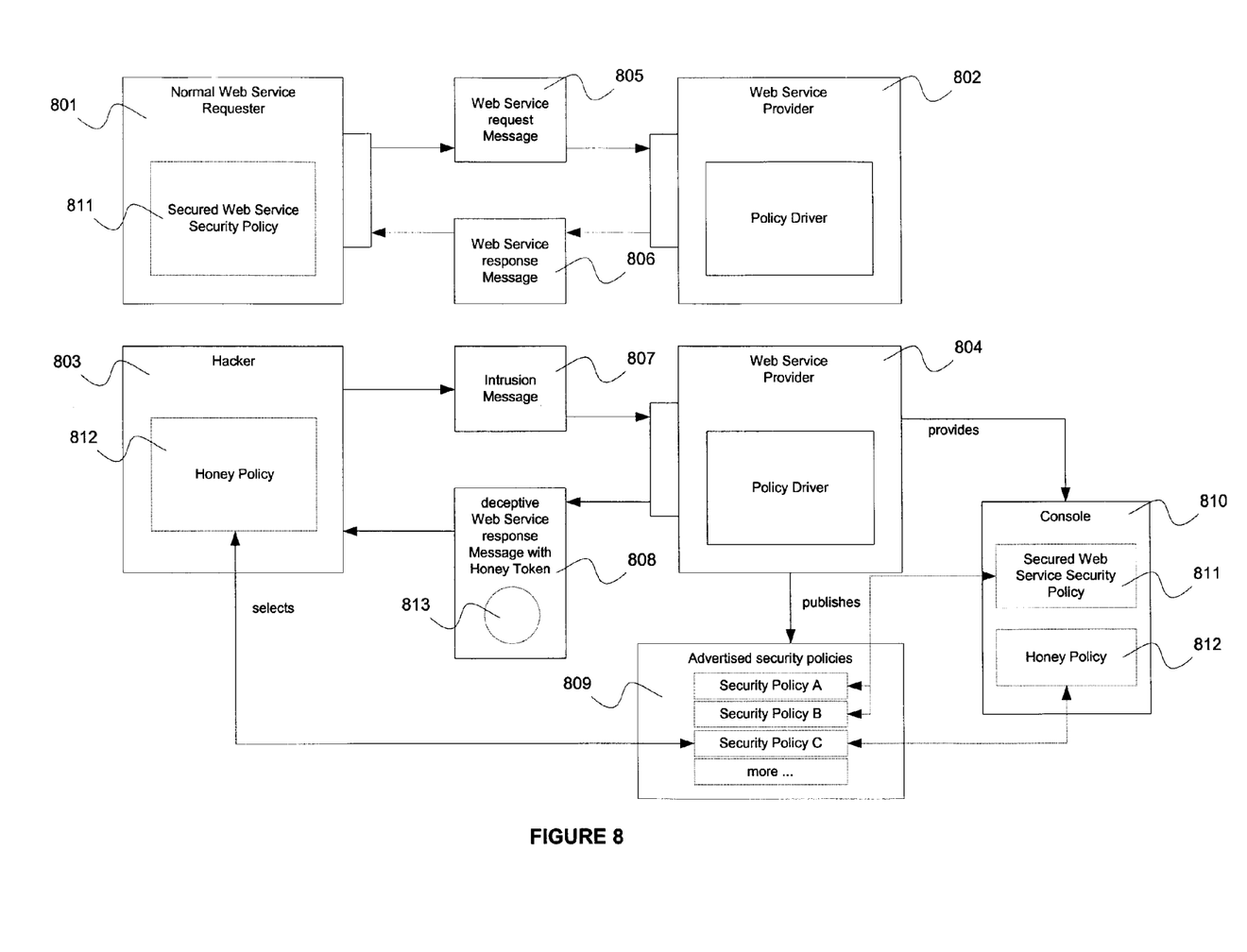
FIG. 8 is an illustration of an exemplary framework of using honey policy along with secured Web Services security policy to attract hacker, detect intrusion message for further tracing the hacker's behavior in order to catch the hacker in accordance with embodiments of the present invention.

In one embodiment of present invention, a computer-implemented machine learning method to prevent intrusion can comprise allowing for the selection of at least one honey policy 812 for a web service and treating a web service messages using the honey policy 807 differently from normal web services messages 805. A honey policy can be a policy that can result into an easy-to-build, less secure and easy-to-hack web service message.

In one embodiment of present invention, a computer-implemented machine learning method to prevent intrusion can further comprise a user interface 810 to receive one or more selections of honey policies.

In one embodiment of present invention, a computer-implemented machine learning method to prevent intrusion can use a honey policy 812 that is a policy alternative that has an encrypted block in the security header that is not bonded to the rest of the message which is subject to the replay attack. One example of such honey policy can be an Encrypted Supporting Token assertion without signature protection in WS-SecurityPolicy.

In another embodiment of present invention, a computer-implemented machine learning method to prevent intrusion can use a honey policy 812 that is a policy alternative that allows sender to be anonymous. Web services security policy can be complicate and difficult to manage in real life. Vulnerability can exist in seemly-errorless security policy. One example is when the sender uses a generated key K to derive two keys: one for encryption and another for message signature. Key K is protected with Server's X509 certificate. In this example, although the policy requires for both signature and encryption, the sender can be anonymous.

In one embodiment of present invention, a computer-implemented machine learning method to prevent intrusion can further comprise publishing or advertising a honey policy on the network.

In one embodiment of present invention, a computer-implemented machine learning method to prevent intrusion will direct the message using a honey policy 807 to a different path.

In one embodiment of present invention, a computer-implemented machine learning method to prevent intrusion will closely monitor the message using honey policy 807. In addition, a deceptive response 808 to the message using honey policy can be sent to an intruder. The deceptive response to the message can contain a honey token 813.

User Defined Preferences

One embodiment of present invention will take consideration of the following in selecting the best policy alternative for a given client and server pair:

Interoperability
System Performance
Security

In one embodiment of present invention, when security is the highest priority for the user, each policy alternative will be analyzed to determine a security score, and then the securest policy alternative can be selected.

In another embodiment of present invention, when the Web Services administrator selects performance as preference, the policy alternative that will result in fastest processing of request and response will be selected.

In some embodiment of present invention, user preference can be supplied during installation, or at the runtime from the configuration UI. The Server will keep tracking the past performance to find the best performance policy alternative for each client-server pair.

Pre-Policy Alternatives Filter

In one embodiment of present invention, all available policy alternatives will be examined first against a pre-policy alternatives filter. Any policy alternative that falls into the following categories can be filtered out:

1. The alternative has unsupported security feature.
2. The alternative has unknown assertion that the process don't know how to build the message.
3. The alternative has conflicted assertions within the same alternative.
4. The alternative required credential is not available.
5. The alternative required algorithm is not supported.
6. The alternative required X509 certificate or public/private key is not available.

Machine Learning and Anomaly Analysis Process

One embodiment of present invention includes automatically tracking the Web Services performance behavior and error conditions at runtime. The processing information of each out going message to each different end-point or incoming message from different initiating end-point can be saved and analyzed in real-time and online. Such information can provide in-depth details of the system performance and interoperability. The information will then be fed back into the security policy selection process, so that the intelligent policy alternative selection can be made.

In one embodiment of present invention, the server can keep tracking the past usage history of security policy alternative from each end point. Such information will help to select a better security policy alternative for response. The system can also learn the preference of each end point, and select the preferred security policy alternative for each end point.

In another embodiment of present invention, the anomaly analysis can be preformed based on the past policy usage history. The abnormal conditions, such as an incoming message using abnormal policy alternative, will be reported and alerted so that proper security actions can be taken.

Another embodiment of present invention can also keep tracking error conditions, detecting the problem of impropriate policy alternative selection case, and will automatically fix the problem by using the policy alternative that will interoperate well with its partner.

Intrusion Prevention Process

One embodiment of present invention provides a quick way to validate incoming policy through pre-scanning the incoming message 702.

Typically, when a secured SOAP message is received, the message has to be decrypted first, the signature on the message needs to be verified, and then based on the decrypted message all the policy alternatives can be located. The message is then verified against each policy alternative. This can be a lengthy process, especially when there are lots of policy alternatives are associated with the message. The message cannot be verified unless the message is decrypted. The selection of policy to be used also cannot be determined before the decryption process, because of the inability to locate the proper operation of the service. Therefore, the policy for the given income message cannot be determined before the decryption.

In one embodiment of present invention, the incoming message is pre-scanned 702 before the decryption 705 and a sketched message outlook is saved 703. After the decryption 705 and policy alternatives are retrieved 707, the available policy alternatives are compared with the sketched message outlook 710 so that unqualified policy alternatives can be filtered out 709 quickly, without compare the incoming message with each policy alternative 707.

One embodiment of present invention uses a machine learning process. The sketched message outlook of all invalid SOAP message will be remembered 713 after the invalid incoming secures messages are decrypted, verified, confirmed and rejected for the first time. After the first time, the rejection of invalid incoming secures messages will be done without going thought the lengthy verification process again.

In one embodiment of present invention, by comparing the sketched message outlook with saved sketched message outlooks 704, an illegal SOAP message can be rejected 714 even before the process of decryption and signature verification. Thus, the denial of service intrusion on the system can be prevented by rejecting the malicious denial of service messages without use much of process power and system's resource.

In one embodiment of present invention, when security vulnerability is found in a Web Service message that a weak policy alternative is discovered later at the runtime, the system provides a mechanism to remove the weak policy alternative dynamically, so that securer security policy alternative will be selected immediately to secure the Web Service.

Honey Policy Alternative

In one embodiment of present invention, an administrator can define honey policy alternatives 812 in addition to secured Web Services security policy alternatives 811. Honey policy 812 is a special policy published and advertised by the service provider in the network to attract hackers, because it is unsecured and can be easily used to build a secured SOAP message for intrusion 807. At the mean time, regular users will use more complicated security policy alternative 811 to build secured SOAP message 805 for Web Services.

For example the Encrypted Supporting Tokens assertion in the WS-SecurityPolicy requires both username and password (Username Token) to be encrypted in the SOAP Message. However, the encrypted block in the security header is not bonded to the rest of the message. It is subject to a replay attack since the intruder can copy the same encryption block into intrusion messages 807 for replay.

Hence, one embodiment of invention can create a honey policy alternative 812 that uses the Encrypted Supporting Tokens assertion without signature protection, while allowing normal user using signed Encrypted Supporting Tokens assertion to protect the Username Token in the secured SOAP message against the replay attacks.

The intruder will likely select the policy alternative that has the Encrypted Supporting Tokens assertion to build the SOAP message for intrusion, because it is easier to hack. As a result, the incoming intrusion message can be detected based on the usage of abnormal honey policy.

In one embodiment of present invention, when the system detect the honey policy alternative 812 is used by the incoming message, the system can direct the hacker of the Web Services into different path so that the really Web Services can be protected against the intrusion and security attack.

Also, in the honey policy alternative path, the intrusion can be closely monitored and a deception response 808 can be send back to the hacker in the case of malicious attack is detected. Honey token 813 can also be sent back to the intruder for further tracing the hacker's behavior in order to catch the hacker.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A computer-implemented method to select a web service security policy alternative, comprising:
   pre-scanning an incoming web service message before decryption;
   receiving, via a web server running on one or more processors, a plurality of security policy alternatives, wherein the plurality of security policy alternatives are defined in different versions of security policy formats;
   performing a pre-selection process that is a security policy alternative filtering and policy standardization process, wherein the pre-selection process comprises at least one of:
   normalizing, via the web server, each different security policy alternative into a standard form that is platform independent and version independent;
   checking to ensure no conflict among the security policy alternatives; and
   eliminating one or more bad security policy alternatives in the plurality of security policy alternatives based on a rule, wherein a said security policy alternative is a bad security policy alternative, if said security policy alternative is associated with at least one of
   an unsupported security feature;
   an unknown assertion;
   an conflicted assertion;
   an unavailable credential;
   an unsupported algorithm; and
   an unavailable X509 certificate or public/private key;
   automatically selecting a web service security policy from the plurality of security policy alternatives at runtime based on past usage history of the plurality of security policy alternatives; and
   applying the selected web service security policy on the web service message.

2. The method according to claim 1, further comprising:
   receiving a user preference in selecting the web service security policy alternative.

3. The method according to claim 2, wherein:
   the user preference includes:
      interoperability within a distributed computing environment;
      end-to-end system performance; and
      security requirement.

4. The method according to claim 1, further comprising:
   automatically selecting a web service security policy from the plurality of security policy alternatives at runtime based on behavior and error conditions in past system performance.

5. The method according to claim 1, further comprising:
   automatically selecting a good security policy alternative and avoiding an error security policy alternative.

6. The method according to claim 1, further comprising:
   tracking past system performance that includes the past usage history of the plurality of security policy alternatives.

7. The method according to claim 1, further comprising:
   saving and analyzing, in real-time and online, process information of each out-going message to different end points and/or each incoming message from different end points.

8. The method according to claim 1, further comprising:
   performing anomaly analysis based on past security policy alternative usage history.

9. The method according to claim 1, further comprising:
   automatically setting a security policy alternative, which was defined by a rule as a bad security policy alternative based on a condition, to be available for selection once the condition is changed.

10. The method according to claim 1, further comprising:
    containing the plurality of security policy alternatives in an available security policy alternative pool.

11. The method according to claim 1, further comprising:
    using a machine learning process application to analyze the past usage history of the plurality of security policy alternatives.

12. The method according to claim 1, further comprising:
    tracking past usage history of security policy alternative from each end point;
    saving and analyzing processing information of each out-going message to each different end-point and processing information of each incoming message from different initiating end-point; and
    feeding back the processing information into a security policy selection process to enable an intelligent security policy alternative selection.

13. The method according to claim 1, further comprising:
    comparing available security policy alternatives with a sketched message outlook in order to filter out unqualified security policy alternatives.

14. The method according to claim 1, further comprising:
    allowing the plurality of security policy alternatives to be defined in different namespaces.

15. The method according to claim 1, further comprising:
    generating a sketched message outlook before decryption; and
    comparing the sketched message outlook with saved sketched message outlooks to reject an illegal message before decryption and signature verification.

16. A non-transitory machine readable medium having instructions stored thereon that when executed cause a system to perform the steps comprising:
    pre-scanning an incoming web service message before decryption;
    receiving, via a web server running on one or more processors, a plurality of security policy alternatives, wherein the plurality of security policy alternatives are defined in different versions of security policy formats;
    performing a pre-selection process that is a security policy alternative filtering and policy standardization process, wherein the pre-selection process comprises at least one of:
    normalizing, via the web server, each different security policy alternative into a standard form that is platform independent and version independent;
    checking to ensure no conflict among the security policy alternatives; and
    eliminating one or more bad security policy alternatives in the plurality of security policy alternatives based on a rule, wherein a said security policy alternative is a bad security policy alternative, if said security policy alternative is associated with at least one of
    an unsupported security feature;
    an unknown assertion;
    an conflicted assertion;
    an unavailable credential;
    an unsupported algorithm; and
    an unavailable X509 certificate or public/private key;

automatically selecting a web service security policy from the plurality of security policy alternatives at runtime based on past usage history of the plurality of security policy alternatives; and applying the selected web service security policy on the web service message.

17. A system to select a web service security policy alternative, comprising:

one or more hardware microprocessors;

a hardware or software policy driver running on the one or more hardware microprocessors, wherein said hardware or software policy driver operates to perform the steps of pre-scanning an incoming web service message before decryption;

receiving, via a web server, a plurality of security policy alternatives, wherein the plurality of security policy alternatives are defined in different versions of security policy formats;

performing a pre-selection process that is a security policy alternative filtering and policy standardization process, wherein the pre-selection process comprises at least one of:

normalizing, via the web server, each different security policy alternative into a standard form that is platform independent and version independent;

checking to ensure no conflict among the security policy alternatives; and eliminating one or more bad security policy alternatives in the plurality of security policy alternatives based on a rule, wherein a said security policy alternative is a bad security policy alternative, if said security policy alternative is associated with at least one of an unsupported security feature;

an unknown assertion;

an conflicted assertion;

an unavailable credential;

an unsupported algorithm; and an unavailable X509 certificate or public/private key;

automatically selecting a web service security policy from the plurality of security policy alternatives at runtime based on past usage history of the plurality of security policy alternatives; and applying the selected web service security policy on the web service message.

\* \* \* \* \*